Aug. 4, 1970     R. J. WRIGHTON     3,522,918
SAFETY HARNESS DEVICE

Filed July 16, 1968     3 Sheets-Sheet 1

INVENTOR.
Robert J. Wrighton
BY *Paul B. Hunter*
Attorney

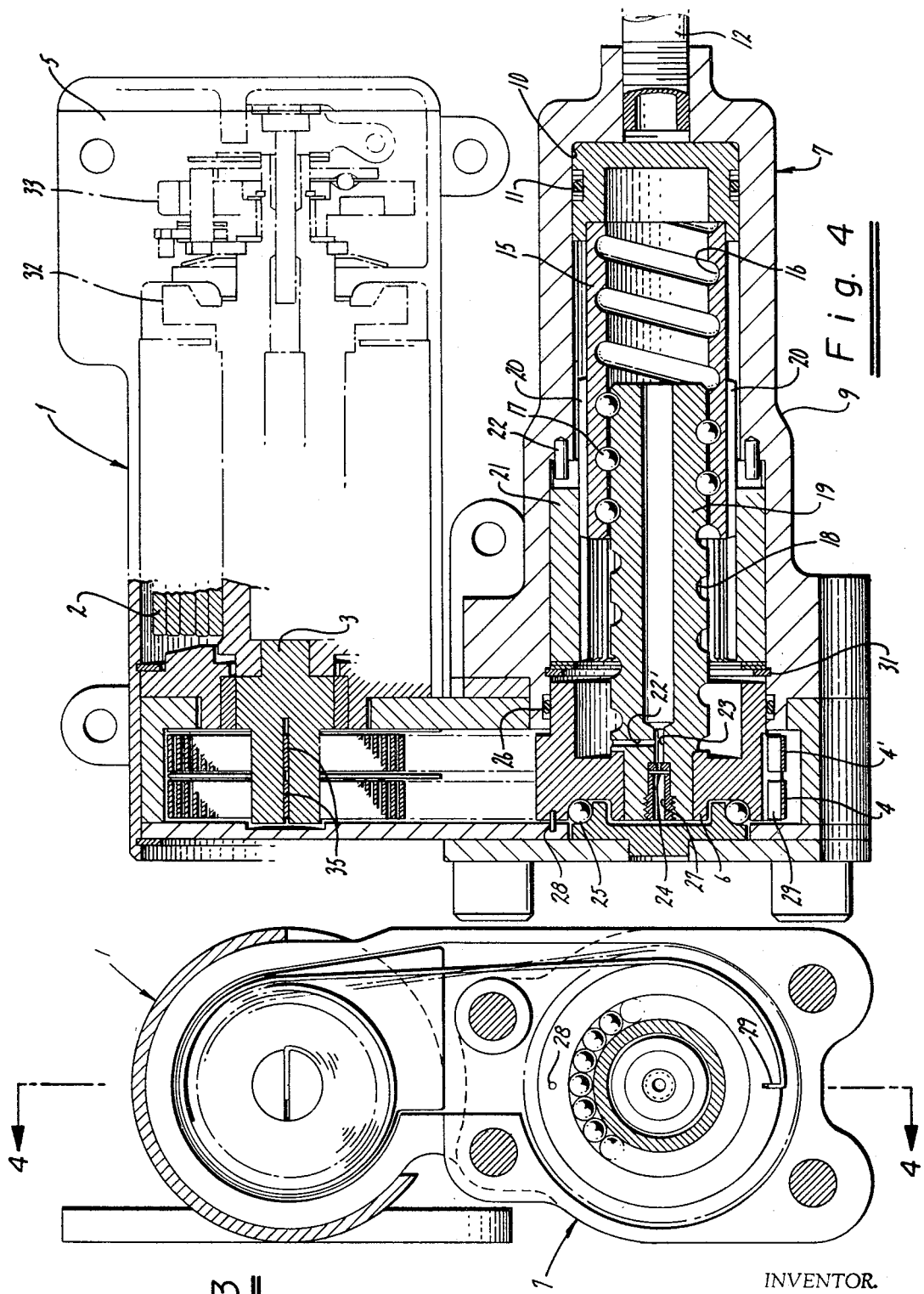

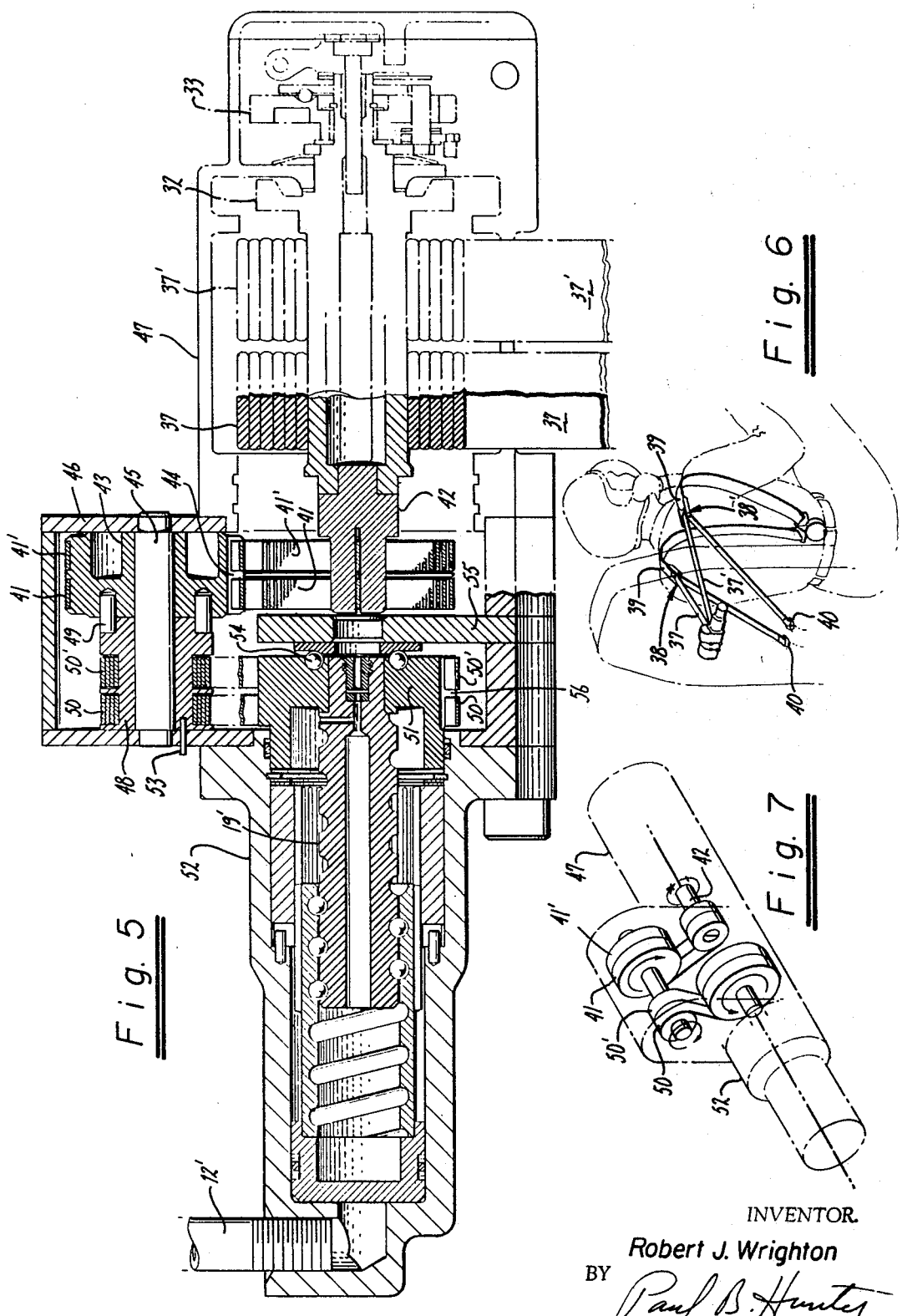

United States Patent Office 3,522,918
Patented Aug. 4, 1970

3,522,918
SAFETY HARNESS DEVICE
Robert J. Wrighton, Anaheim, Calif., assignor to Pacific Scientific Company, City of Commerce, Calif., a corporation of California
Filed July 16, 1968, Ser. No. 745,286
Int. Cl. B64d 25/06
U.S. Cl. 244—122                 5 Claims

ABSTRACT OF THE DISCLOSURE

A safety harness device of the inertia type wherein the rewind spring is connected to a fluid pressure actuated portion that is normally inoperative during ordinary operations of the safety harness, but which, when actuated by the user, serves to pull upon the rewind spring to rapidly haul in the user, without injury to him however, against the back of his seat prior to ejection regardless of decelerating forces obtaining at the time.

---

This invention relates generally to safety harness devices for use in protecting persons in moving vehicles, especially aircraft, and more particularly to a novel improved inertia-operated safety device employing gas pressure actuating means for effecting rapid pull-back of the user prior to ejection of the latter from the vehicle, as during emergencies.

The present safety device employs a harness reel that is responsive to the rate of acceleration of the pilot, passenger, or user, with respect to his seat, and operates directly in response to the accelerations exerted on a strap resulting from forces applied to the strap through the user's shoulder harness by movements of his body, the device normally operating automatically upon sudden violent movement of the body to secure the pilot or user safely in his seat, as disclosed in U.S. Pat. No. 3,018,065, C. E. Cushman et al., inventors.

According to the present invention, the rewind spring means of the inertia responsive safety harness device, as of the type disclosed in the above-mentioned patent, instead of being connected to the harness casing, is connected to a rotatable drum mounted in the ballistic portion of the safety harness device, which drum is normally fixed against turning during all normal operations of the safety harness device. However, should the pilot or user wish to eject from his vehicle, means are provided for rotating the drum so as to wind the rewind spring means thereon to cause turning of the reel spindle and effect rapid retraction of the strap, thereby moving the user's body rapidly but safely against the back of his seat preparatory to ejection.

The principal object of the present invention is therefore to provide an exceedingly light-weight, rugged and dependable safety harness device, not only capable of restraining the user from injury due to crashes, excessive decelerations, and the like, but also enabling the user to be forceably moved to the back of his seat, regardless of decelerating forces occurring at the time, in preparation for ejection from the vehicle.

A feature of the present invention is to provide a novel safety harness device of the above character having an actuated haul-back portion acting upon the harness reel wind-up spring means, when desired, to cause the harness strap to retract and secure the user against the back of his seat.

Another feature of the present invention is to provide a novel safety harness device of the above character wherein the actuated portion of the same does not operate and is not activated during normal operation of the reel portion of the device, but only operates preparatory to ejection, thereby preventing wear and possible malfunction of the ballistic portion when called into use.

Other features and advantages of the present invention will become more apparent after a perusal of the following specification taken in connection with the accompanying drawings wherein:

FIG. 3 is an enlarged sectional view taken along line 3—3 of FIG. 1;

FIG. 4 is an enlarged fragmentary sectional view taken along line 4—4 of FIG. 3;

FIG. 5 is a view similar to to FIG. 4 of a modified structure;

FIG. 6 is a schematic view of a typical installation of the safety harness device of FIG. 5; and FIG. 7 is a schematic view showing the wind-up spring means of FIG. 5.

Similar characters of reference are used in the above figures to designate corresponding parts.

Figure 2:
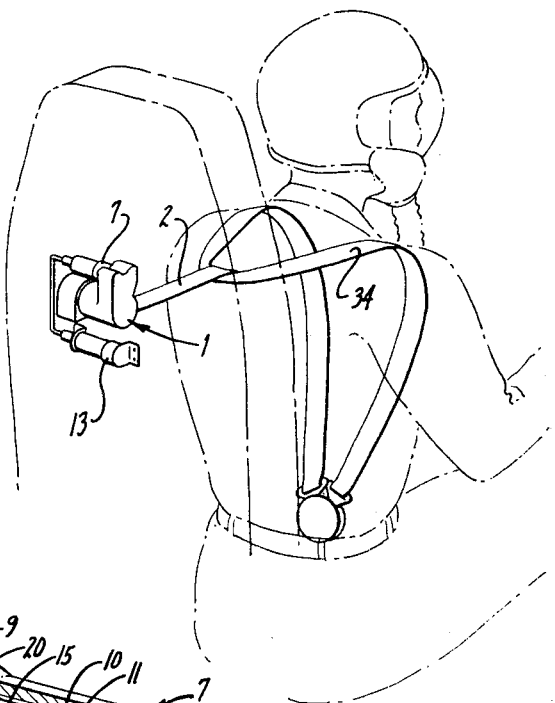
FIG. 2 is a schematic view of a typical installation of the safety harness device of FIG. 1.

Referring now to FIGS. 1 through 4 of the drawings, the reference numeral 1 designates the inertia-responsive portion of the safety harness device of this invention, shown as of the type disclosed in Pat. No. 3,018,065, in which patent disclosure the inventor hereof is a co-inventor, the said device having a strap or webbing 2, which could also be a cable if desired, that is wound upon the shaft or spindle 3 of the device 1 and has its outer end adapted to be connected to the shoulder harness 34 of the user as illustrated in FIG. 2, the said device 1 having a locking ratchet wheel 32 and an inertia flywheel 33 and associated parts as described in said above patent. Device 1 is normally mounted on the back of the user's seat or in some other convenient location in close proximity to the user. This inertia-responsive portion of the safety harness device acts to lock the strap 2 against pay-out in the event of excessive accelerations of the body of the user, and is also shown having a manually operated locking lever 8, all as disclosed in said patent.

Figure 1:
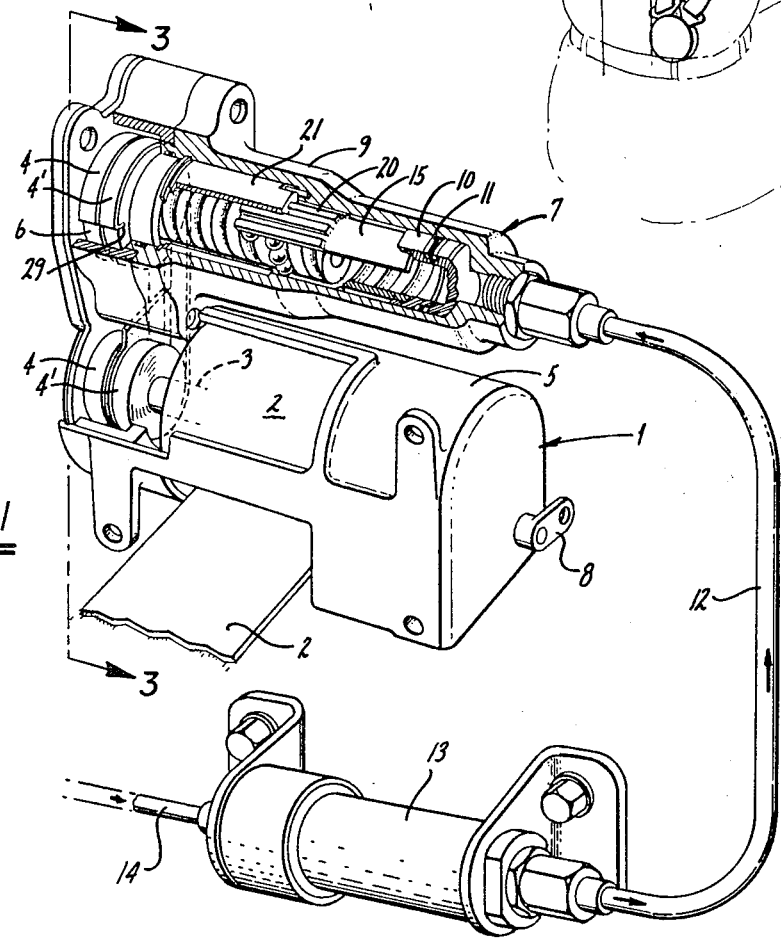
FIG. 1 is a perspective view, with portions broken away, of the novel safety harness device of this invention.

The safety device portion 1 is shown provided with rewind spring means consisting of two rewind springs 4 and 4' instead of a single spring that is normally used as disclosed in the above-mentioned patent. The rewind springs 4 and 4' of the device 1 have their inner end portions wound around and secured to the reel shaft 3 at 35 and their outer ends extend outwardly of the casing 5 of safety device portion 1, which outer ends are connected to the peripheral portion of a drum 6, these springs normally extending partly around this drum as shown in FIG. 1. Either of the rewind springs 4 and 4' is made strong enough to effect rewinding of the reel shaft 3 in use. Actually, one spring could be used alone, but two springs add to the reliability of the device in emergencies. Thus, it will be noted that instead of having the outer ends of springs 4 and 4' attached to the casing 5, as in said earlier patent, they are now attached to the drum 6 of a fluid pressure actuated portion 7 of the reel.

The fluid pressure actuated portion 7 of the reel comprises a housing or cylinder 9 within which is slidably mounted a hollow piston 10 having an O-ring seal 11. The piston 10 is normally positioned at one end of the cylinder 9 to which end a conduit 12 is connected, the said conduit leading to a fluid pressure source or cartridge 13 that is adapted to be fired as by a blow upon cartridge plunger 14. The conduit 12 and the interior of the cylinder 9 are preferably filled with a suitable oil or grease, such as silicone oil or grease, which in practice enables the fluid pressure source or cartridge 13, when discharged, to rapidly build up a high pressure for moving the grease or oil and hence piston 10 within the cylinder 9. The piston 10 normally abuts the ballscrew nut 15 extending within cylinder 9, which nut is internally helically grooved at 16, having balls 17 therein, which balls engage conforming helical grooves 18 in an inner ballscrew hollow shaft 19 having one end portion thereof extending into the ballscrew nut 15 and having the drum 6 secured upon its other end portion to which drum are connected the outer end portions of the rewind springs 4 and 4' as by having their turned over ends engaged in slot 29 in drum 6. It will be noted that the ballscrew nut 15 is provided with longitudinal splines 20 which project into slogs provided in a conforming sleeve 21 fixed as by pins 22 and shim 31 within the cylinder 9.

The hollow ballscrew nut 15 and hollow ballscrew shaft 19 are normally also filled with a suitable oil or grease such as a relatively low viscosity silicone oil, or other hydraulic fluid, just as is conduit 12, this grease also surrounding the ballscrew shaft 19 within the cylinder 9. Connecting orifices 22' and 23 within ballscrew 19 are adapted to convey this grease, during operation of the actuated portion of the safety device, to a rupture disc 24 which, as will further appear, will rupture in use allowing the hydraulic fluid to escape from the interior of cylinder 9 through port 27 and out past ball bearings 25, permitting rapid, though not excessive, movement of piston 10, actuated nut 15 driven thereby and rotation of ballscrew 19 so as to turn drum 6 to wind springs 4 and 4' upon this drum, hence turning reel shaft 3 and winding in the strap 2. It will be noted that the drum 6 is supported in the combined radial and thrust ball bearing 25 at one end thereof and is turnably mounted within the cylinder 9 at the other end thereof, an O-ring seal 26 being provided between drum 6 and the interior wall of cylinder 9 to prevent the escape of hydraulic fluid in use.

In operation, when the user desires to eject from the vehicle, he will actuate plunger 14 or use other means for initiatiing the ballistic cartridge or other source of fluid pressure 13, whereeupon, owing to the confinement of the gases within the source 13 due to the presence of the hydraulic fluid within tubing 12, there will be a rapid build-up in pressure which will force the hydraulic fluid and piston 10 towards the left as viewed in FIGS. 1 and 3, and as this piston moves towards the left it will also move ballscrew 15, causing the rapid turning of ballscrew shaft 19 and consequent turning of the drum 6. The hydraulic fluid within the cylinder 9 will break the rupture disc 24, and this fluid will escape through port 27. However, this fluid gives the device a dashpot action so that excessive acceleration of the shoulder harness strap 34 against the chest of the user is prevented, and the user is moved back rapidly but without the exertion of dangerous forces upon his chest. It is found that, in practice, with the strap 2 fully extended, the rewind springs 4 and 4' are wound to within approximately one-half of a turn of being fully tight on the harness reel shaft 3. The actuated portion 7 will operate satisfactorily regardless of the position of the user, whether he is leaning forward or is positioned towards the back of his seat, and, nevertheless, the drum 6, acting through the rewind springs 4 and 4', will turn the reel shaft 3 to pull the strap 2 inwardly of the reel casing 5 to quickly position the user against the back of his seat. Preferably, a small air bubble is generally allowed to remain in the oil within casing 9 to allow for expansion. This air bubble is compressed and its effect eliminated by the initial travel of the piston 10. This same initial travel is also used to tighten the approximately one-half turn of slack provided in the springs 4, 4' on a full haulback; therefore, even on a partial haulback there is no high shock loads applied to the retraction springs or harness reel.

It will be noted that the drum 6 is held against turning during ordinary locking operations of the inertia-responsive portion 1 of the safety harness device as by a shear pin 28, but this pin will shear when the actuated portion 7 functions, so that it will be seen that there is no turning of the drum 6 and of the ballscrew shaft 19, nor movement of the ballscrew nut 15, during ordinary operation and locking of the inertia portion of the reel, so that the seals such as 11 and 26 are not worn in normal use of the device and the parts of the actuated portion 7 remain tight and reliable up to the time of their use during ejection.

It will be noted that the double use of the springs 4 and 4' not only serving as rewinding springs for the inertia portion of the safety harness device but also serving as a means for pulling the user to the back of his seat before ejection due to the rotation of drum 6, eliminates the need for a gear train between these two portions of the device, and hence eliminates the necessity for turning the drum 6 whenever the reel shaft 3 turns.

The structure of FIGS. 1 through 4 provides a normal haulback travel of the strap 2 which is generally of the order of eighteen inches, but for some installations such as shown in FIG. 6 twice this travel is required of the strap, i.e., a haulback of approximately thirty-six inches is required. In FIG. 6, the dual extended straps 37, 37' pass over rollers 38, 38' attached to the user's shoulder harness 39 and have their ends attached to fittings 40 anchored to the back of the seat structure. The modified safety harness device for this form of the invention is shown in detail in FIGS. 5 and 7.

In this form of the invention, the rewind spring means comprises rewind or retraction springs 41, 41' positioned side-by-side with their inner ends wound around and secured to the reel shaft 42 and their outer ends attached to the periphery of a spool 43 as by engaging in a notch 44 therein. Spool 43 is turnably mounted on a shaft 45 carried within an extension 46 of reel casing 47. A smaller spool 48 is also turnable on shaft 45 and is fixed to spool 43 by pins 49 so as to rotate therewith. Steel bands 50, 50' are attached at their inner ends to spool 48, are wrapped therearound and extend therefrom to the relatively large drum 51 within actuated housing 52 and have their outer bent-over ends engaged in nootch 56 in this drum. The mechanism in housing 52 is similar to that in actuated housing 7, drum 51 being similar to drum 6 but of larger diameter, is mounted on ballscrew shaft 19', and is carried by radial and thrust bearing 54 mounted on partition 55.

In use, during normal movements of the user the retractor springs 41, 41' allow in and out movements of the straps 37, 37', the spool 43 serving as an outer anchor for the springs 41, 41'. In case of sudden deceleration resulting in the locking of the reel shaft 42, the straps 37, 37' will hold the user in his seat. In case an ejection is desired, a pressure cartridge (not shown) supplies pressure fluid through conduit 12' to effect the rotation of large drum 51 which, acting through steel bands 50, 50', spools 48 and 43, serves to wind the retractor springs 41, 41' upon spool 43, thereby winding in the straps 37, 37' to move the user to the back of his seat and hold him there firmly prior to the actual ejection. The driving action of the rewind spring means is illustrated by the arrows in FIG. 7.

The device of the present invention can be made very light and reliable in use, in fact considerably lighter than anything heretofore available, and, of course, as previously mentioned, the harness reel portion of the device is used for its normal intended purpose without requiring cycling of the actuated portion which would otherwise result from the normal pulling in and out of the webbing or strap. Thus, the seals in the units 7 and 52 are never worn or used until actual ballistic firing is made, and therefore they remain essentially new at all times. If gears were used, drums 6 and 51 would have to be gears, and every time the webbing or strap were pulled in or out due to normal operation, the O-ring seals would be rubbing and would become worn, and hence unreliable in use; in such case, retraction springs would still be needed, and would have to be heavier because it would be necessary for them to work against the friction of the O-ring seals as well as perform their normal intended function, and this would add to the fatigue of the wearer during normal use of the system.

It will be noted that the pressure cartridge 13 is located remotely and plumbed to the inlet of the ballistic reel. When this is done, the length of the conecting high pressure tubing 12 represents a variation in the initial volume into which the ballistic cartridge will be fired. Any change in initial volume greatly affects the amount of usable energy available for the power haulback. The greater the initial volume the less energy there will be available, and, of even greater significance, the slower the cartridge will burn, and therefore the lower the initial operating pressures will be. The initial operating pressure is critical in that this is the pressure that starts the haulback and therefore greatly affects the total time required. The present safety device provides a very simply way of eliminating the effect of variations in the initial volume. This consists of filling the connecting tubing with the proper amount of hydraulic fluid such as silicone oil or grease, for example, this fluid having the net effect of allowing the user to compensate for the effect of different initial volumes on different installations. The grease itself eventually is consumed; however, its effect on the total energy is nil.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A safety harness device comprising an inertia-responsive portion having a casing, a spindle rotatable within said casing, a strap wound on said spindle and extending outwardly of said casing for connection to the safety harness of a user, said device having a fluid pressure actuated portion comprising a housing adjacent said inertia portion, a drum rotatable within said housing, a piston within said housing connected for driving said drum, rewind spring means connected between said spindle and said drum, means holding said drum against turning movement during normal operations of said inertia-responsive portion, said rewind spring means permitting unwinding of said strap and causing rewinding thereof during normal movements of the user in his seat, and a conduit connecting a source of fluid pressure to said housing to drive said piston, the activation of the fluid pressure source in an emergency causing yielding of said drum holding means to effect the rotation of said drum and the winding of said rewind spring means thereon, thereby rotating said spindle to rewind said strap and draw the user firmly against the back of his seat prior to ejection.

2. A safety harness device as defined in claim 1 wherein said rewind spring means has its inner end portion wrapped around and connected to said spindle and its outer end portion extending exteriorly of said casing into said housing and connected to the periphery of said drum, said drum holding means comprising a pin carried by said housing to hold said drum against turning movement during normal in and out movements of said strap and during locking operations of said inertia-responsive portion, said rewind spring means permitting unwinding of said strap and causing rewinding thereof during normal movements of the user in his seat, said conduit containing a hydraulic fluid that extends throughout said fluid pressure actuated portion, said hydraulic fluid acting, upon the activation of said fluid pressure source in an emergency, to cause yielding of said drum holding pin to effect the rotation of said drum and the winding of said rewind spring means thereon, thereby rotating said spindle to rewind said strap and draw the user quickly and firmly against the back of his seat prior to ejection, said fluid pressure actuated housing embodying dashpot means incorporated therewithin to prevent injury to the user.

3. A safety harness device as defined in claim 1 wherein a driving connection is included between said piston and said drum, said driving connection including a hollow ballscrew nut abutting said piston and a hollow ballscrew shaft engaging said nut, said nut and shaft as well as said housing and conduit being normally filled with hydraulic fluid, said ballscrew shaft having an orifice and a rupture disc normally closing the same, movement of said piston causing telescoping of said nut and shaft resulting in the rupture of said rupture disc due to increasing pressure in the contained hydraulic fluid, whereby the fluid escapes relatively slowly from said housing preventing undue pressure by the safety harness upon the user.

4. A safety harness device as defined in claim 1 wherein said source of fluid pressure comprises a ballistic cartridge, the energizing of such ballistic cartridge causing the generated gases to drive said hydraulic fluid and hence said piston causing shearing of said shear pin to effect rotation of said drum, thereby winding said strap rapidly into its casing.

5. A safety harness device as defined in claim 1 wherein said rewind spring means comprises a retraction spring connected to and wrapped around said spindle, a large and a small spool positioned side-by-side and turnable together located exteriorly of said spindle and extending parallel thereto, said retraction spring being attached to the periphery of said large spool, and a steel band wound around said small spool and connected to the periphery of said drum, whereby mechanical multiplication of the travel of said fluid pressure actuated piston is effected to thereby retract a large length of strap in use.

References Cited

UNITED STATES PATENTS

| | | | |
|---|---|---|---|
| 3,018,065 | 1/1962 | Cushman et al. | 242—107.4 |
| 3,077,324 | 2/1963 | Strickland | 244—122 |
| 3,386,683 | 6/1968 | Howland | 244—122 |

MILTON BUCHLER, Primary Examiner

J. E. PITTENGER, Assistant Examiner

U.S. Cl. X.R.

242—107.6; 280—150